United States Patent
Sambotin (10) Patent No.: US 7,689,604 B2
(45) Date of Patent: Mar. 30, 2010

(54) COMPLEX DATASTORE WITH BITMAP CHECKING

(75) Inventor: Dragos C. Sambotin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 339 days.

(21) Appl. No.: 11/800,701

(22) Filed: May 7, 2007

(65) Prior Publication Data
US 2008/0281777 A1 Nov. 13, 2008

(51) Int. Cl.
*G06F 17/30* (2006.01)
(52) U.S. Cl. .......................... 707/205; 711/1
(58) Field of Classification Search ................. 707/205, 707/1, 100, 101, 200; 711/1, 5, 100, 170
See application file for complete search history.

(56) References Cited

U.S. PATENT DOCUMENTS

| | | | | |
|---|---|---|---|---|
| 6,182,089 | B1 * | 1/2001 | Ganapathy et al. | 707/206 |
| 6,480,935 | B1 * | 11/2002 | Carper et al. | 711/115 |
| 6,484,186 | B1 | 11/2002 | Rungta et al. | |
| 6,748,504 | B2 | 6/2004 | Sawdon et al. | |
| 6,823,436 | B2 | 11/2004 | Krishnamurthy | |
| 6,918,113 | B2 | 7/2005 | Patel et al. | |
| 7,533,274 | B2 * | 5/2009 | Freeman et al. | 713/189 |
| 2002/0026436 | A1 | 2/2002 | Joory | |
| 2004/0064554 | A1 | 4/2004 | Kuno et al. | |
| 2004/0186967 | A1 * | 9/2004 | Anand | 711/156 |
| 2005/0257097 | A1 | 11/2005 | Jarvis et al. | |
| 2006/0129611 | A1 | 6/2006 | Adkins et al. | |
| 2006/0265761 | A1 | 11/2006 | Rochette et al. | |
| 2008/0077590 | A1 * | 3/2008 | Pandit | 707/8 |
| 2008/0209153 | A1 * | 8/2008 | Schneider | 711/170 |

OTHER PUBLICATIONS

Piromsopa et al., "Secure Bit: Transparent, Hardware Buffer-Overflow Protection", IEEE Transactions on Dependable and Secure Computing; Washington (1545-5971), Oct.-Dec. 2006. vol. 3,1ss. 4;p. 365-377. Download: http://proquest.umi.com/pqdlink?Ver=1&Exp=10-27-2014&FMT=7&DID=1172440891&RQT=309.*

(Continued)

*Primary Examiner*—Shahid A Alam
*Assistant Examiner*—Hares Jami
(74) *Attorney, Agent, or Firm*—Krajec Patent Offices, LLC; Russell S. Krajec (57) ABSTRACT

A datastore, such as a registry or file system having a defined data structure with a logical layer, may be analyzed using a bitmap corresponding to equally sized blocks of data in the datastore. The bitmap is created by traversing the datastore and setting a bit at the beginning of each cell of data, where one cell may have multiple blocks. The datastore is traversed again at a logical layer to verify that each cell is used only one time. The second traverse may unset the beginning bit of each cell as the cell is used. An inconsistency is detected in the datastore when a bit is already unset during the second traverse and when set bits exist after the second traverse.

15 Claims, 4 Drawing Sheets

OTHER PUBLICATIONS

Ganapathi, et al., "Why PCs Are Fragile and What We Can Do About It: A Study of Windows Registry Problems", http://www.cs.berkeley.edu/~archanag/publications/dsn04.pdf.

Roussev, et al., "Analyzing Persistent State Interactions to Improve State Management", Date: Jun. 26-30, 2006, http://delivery.acm.org/10.1145/1150000/1140321/p363-verbowski.pdf?key1=1140321&key2=5490734711&coll=GUIDE&dl=GUIDE&CFID=17400244&CFTOKEN=72738814.

Whitaker, et al., "Configuration Debugging as Search: Finding the Needle in the Haystack", http://www.cs.rutgers.edu/~-badri/553dir/papers/gribble-osdi04.pdf.

* cited by examiner

COMPLEX DATASTORE WITH BITMAP CHECKING

BACKGROUND

Many computer applications use various mechanisms to store data, such as various types of file systems, registry storage, or other applications. In many cases, a datastore may contain data that is used for operating a device or application. Often, a datastore may have a data storage area that may comprise actual data as well as a metadata repository that contains various metadata that may be used with the data.

For high value or sensitive data, including data that is used for fundamental or critical device operations, various error checking mechanisms may be used. In many datastores, rigid rules may define the configuration of the data and various mechanisms for accessing the data.

SUMMARY

A datastore, such as a registry or file system having a defined data structure with a logical layer, may be analyzed using a bitmap corresponding to equally sized blocks of data in the datastore. The bitmap is created by traversing the datastore and setting a bit at the beginning of each cell of data, where one cell may have multiple blocks. The datastore is traversed again at a logical layer to verify that each cell is used only one time. The second traverse may unset the beginning bit of each cell as the cell is used. An inconsistency is detected in the datastore when a bit is already unset during the second traverse and when set bits exist after the second traverse.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Registries and other high importance datastores may be defined using a standard sized block of data. The datastore may be verified using a two pass process. In the first pass, a bit within a bitmap is set for the beginning block of each cell of data. In the second pass, a logical layer is analyzed and a bit is unset for the beginning block of each cell of data. A properly formed datastore would not encounter set bits in the first pass nor would it encounter unset bits in the second pass. Further, no set bits would be left in the bitmap after the second pass.

A cell may be defined to store a specific variable or file of data and may be made up of one or more blocks of data. The block of data may be any size, and may vary greatly from one application to another. Typically, blocks of data may be a consistent size throughout a datastore.

The datastore may have a logical layer of metadata that points to the beginning block of a particular cell. In some embodiments, the logical layer may also include the total number of blocks of data that make up the cell. The logical layer may be constructed so that one cell of data may be referenced by one variable.

The analysis of a datastore in this manner may enable a system to quickly and effectively verify that a datastore is properly formed. Some datastores, especially registries, are frequently targeted by malicious software since problems in the registry may cause unexpected behaviors by the system, including seizing the system or other catastrophic failures.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
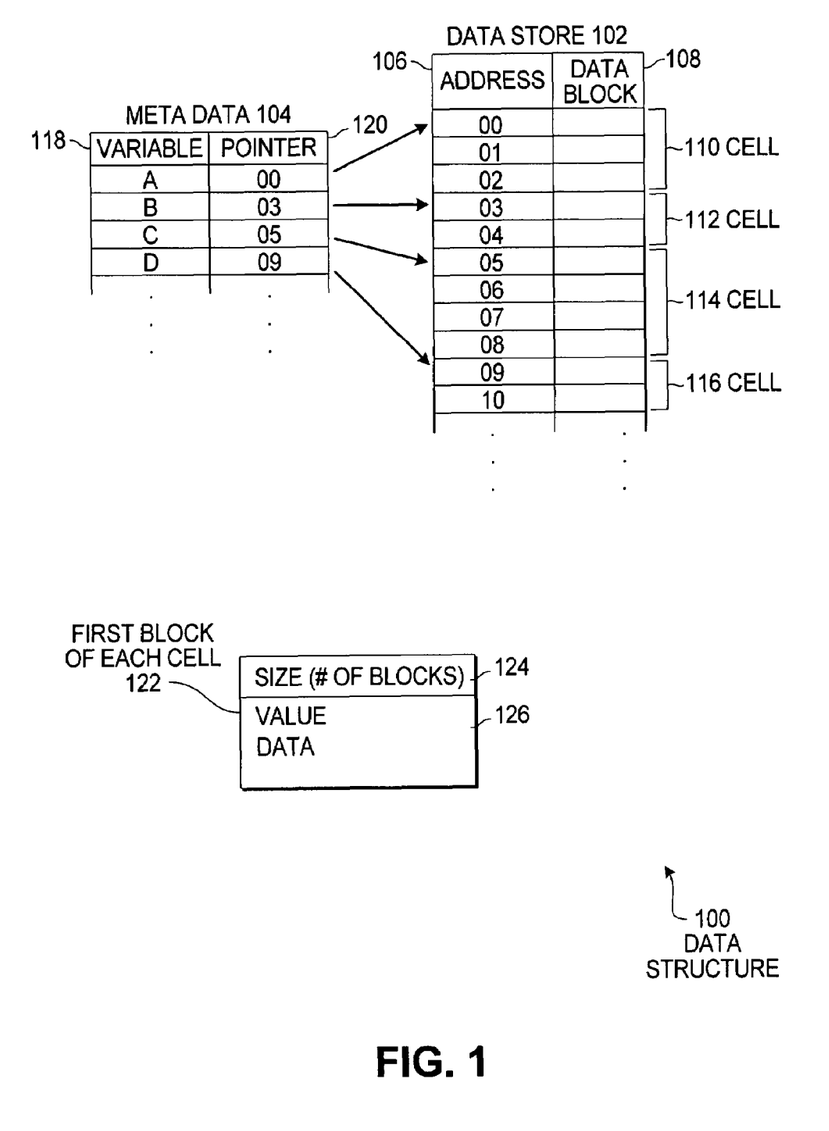
FIG. 1 is a diagram of an embodiment showing a data structure having a datastore and metadata.

FIG. 1 is a diagram of an embodiment 100 showing a data structure that may be validated using a bitmap. The data structure of embodiment 100 is explained first, then a process for validating the data structure is shown in embodiment 200 of FIG. 2. Several examples of valid and invalid data structures are illustrated in various embodiments of FIG. 3.

The data structure comprises a datastore 102 and metadata 104. The datastore 102 has a series of data blocks 108, each of which having an address 106. The address 106 may correspond with a position for each block within the datastore 102.

In many embodiments, the data blocks 108 may be the same size. The size may correspond with a physical parameter, such as a block of data stored on a disk drive or in another memory, or may have a predetermined number of bytes, or some other size. In some embodiments, the data blocks 108 may be of different sizes within a datastore 102.

Groups of blocks may be used to define a cell, such as cells 110, 112, 114, and 116. Each cell may contain data for a variable that is defined in the metadata 104. Cells may vary in size so that data of different lengths may be stored.

The metadata 104 comprises a listing of variables 118 with pointers 120. The pointers 120 point to the beginning data block for the cell assigned to the variable. For example, variable A has a pointer to block 00, variable B has a pointer to block 03, and so on.

In many embodiments, the metadata 104 may have additional metadata about a variable, such as the type of variable, the full name of the variable, an owner for the variable, or other information. Different embodiments may structure the metadata 104 to include some of these metadata as well as include other metadata.

The first block of each cell 122 in the datastore 102 may includes a size 124 and value data 126. In some embodiments, the first block of each cell may include additional metadata. The size 124 may indicate the number of blocks in a cell. The value data 126 may be the actual data which is being stored as the variable 118.

In many embodiments the first or last block of data in a cell may have a special sequence of bits or a special byte that may be used to indicate the respective beginning or end of a cell.

The data structure illustrated in embodiment 100 is a typical data structure that may be adapted to store any type of data. For example, a similar embodiment may be used for establishing a file system for data stored on a hard disk or other media. Other embodiments may be used for data storage on board a mobile device. Still other embodiments may be used for storing registry data in an operating system environment.

The data structure and validity mechanisms described below are suited for embodiments where data integrity is desired. By using a defined data structure with mechanisms for testing the validity of the data structure, more confidence may be had that the data is valid and the opportunity of improper operation due to invalid data is lessened substantially.

Figure 2:
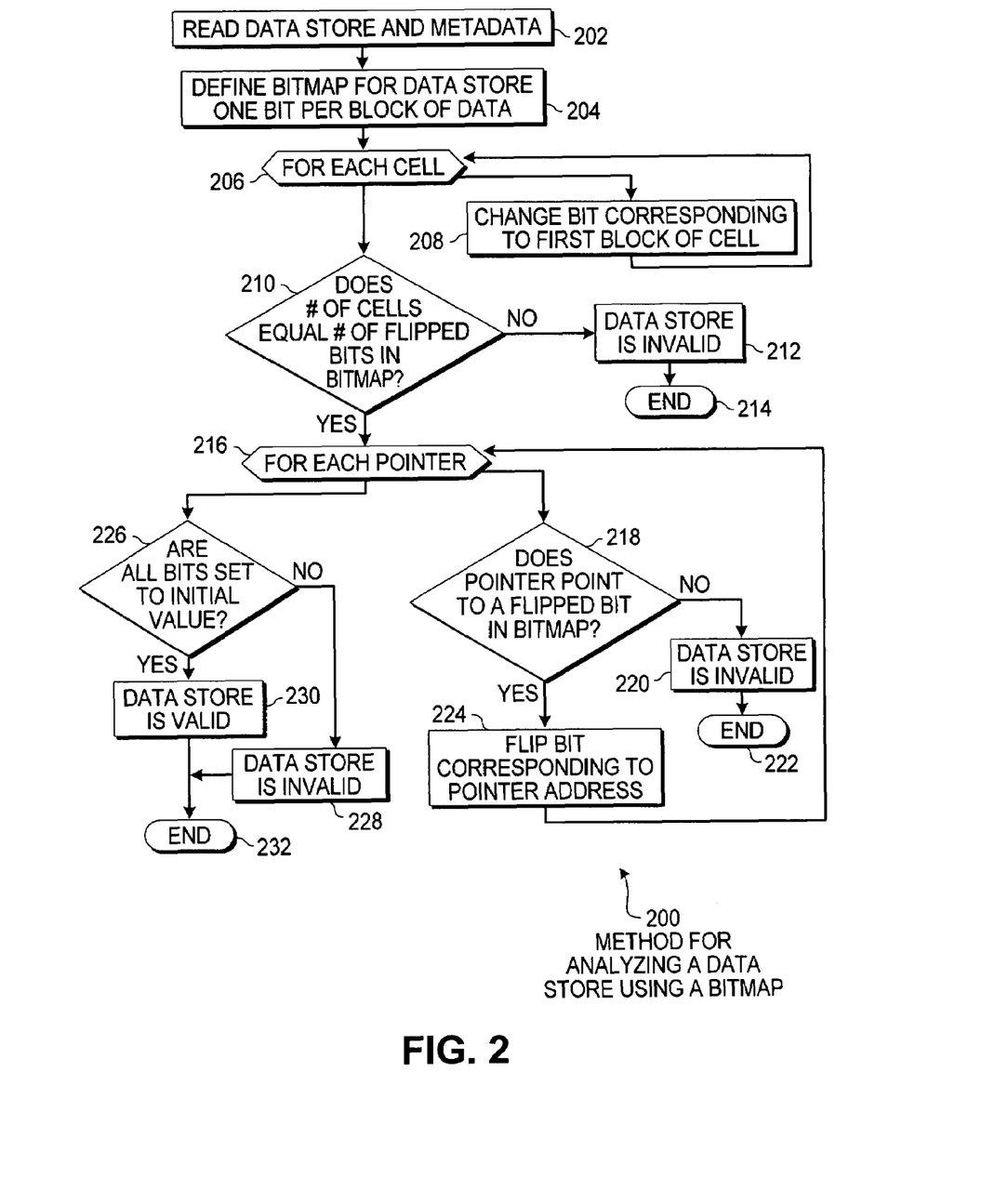
FIG. 2 is a flowchart illustration of an embodiment showing a method for validating the data structure of FIG. 1.

FIG. 2 is a flowchart illustration of embodiment 200 showing a method for analyzing a datastore using a bitmap. Embodiment 200 is a method for testing validity of a data structure similar to that of embodiment 100. Some embodiments may use a portion of the method of embodiment 200 to test validity while others may use additional processes and tests.

The datastore and metadata are read in block 202.

A bitmap is defined for the datastore in block 204, with one bit assigned for each block of data in the datastore. In general, a bitmap defined in such a way may be several orders of magnitude smaller than the datastore. Even when a block of data is relatively small, such as 64 bytes of data per block, a bitmap would be 1/256 of the size. In many cases, the size of a block of data may be substantially larger than 64 bytes and the size of a bitmap would be proportionally smaller.

For each cell in the datastore in block 206, a bit corresponding to the first block of a cell is flipped in the bitmap in block 208. In embodiments such as embodiment 100 where the first block of a cell 122 contains the number of blocks in a cell, the steps of blocks 206 and 208 may be performed by traversing the datastore directly. In other embodiments, the number of blocks in a cell may be stored in a separate metadata storage and such metadata would be used to determine the starting block of each cell for block 206.

After processing the cells in block 206, the number of cells or variables should equal the number of bits that are flipped in block 210. If the number is not equal in block 210, the data store may be considered invalid in block 212 and the process may end in block 214.

The number of bits in the bitmap may not be equal to the number of cells or variables for different reasons. Once case is when a duplicate variable exists, or when two variables have pointers to the same cell. Another case may be when a starting block has an incorrect value for the number of cells or if a starting or ending indicator is missing from the first or last block in a cell. Such problems may be detected in block 210.

The analysis may continue by traversing the metadata by each pointer in block 216.

As each pointer is evaluated, a first check evaluates whether the pointer points to an unflipped bit in the bitmap in block 218. In the previous traverse of the datastore, a bit was flipped for the starting block of each cell within the datastore in block 208. In block 218, the pointer should point to the starting block of a cell. If not, the data store is invalid in block 220 and the process ends in block 222. If the pointer does point to a starting block of another cell, as indicated by a flipped bit in the bit map, the bit is flipped again to the initial value in block 224 and the next pointer is evaluated.

The comparison may fail in block 218 for a number of reasons. For example, a failure will occur when a pointer is directed to the middle of a cell. Such an error would likely result in corrupt data being returned for the variable. Also, if two or more variables are pointed to the same starting location, the comparison of block 218 would fail with the second variable, since the first variable would point to the starting block with a flipped bit, but would be reset to the initial value after the first pass.

After traversing all off the pointers in block 216, if all the bits in the bitmap are set to the initial value in block 226, the datastore is valid in block 230 and the process ends in block 232. If one or more bits are set to a flipped value in block 226, the datastore is invalid in block 228 and the process ends in block 228.

The embodiment 200 assumes that there is a one to one correlation between variables in the metadata and cells within the datastore. Further, each variable in the metadata is assumed to point to a starting block within a cell.

Embodiment 200 is useful in datastores such as an operating system registry because viruses and other malicious software sometimes target the registry by attempting to change portions of the registry in attempts to make the operating system become unstable or unreliable. By periodically testing the validity of a registry, including during boot sequences, the registry may be validated before use. When an invalid registry is detected, a backup version or previously stored version may be used in place of the invalid version.

Figure 3A:
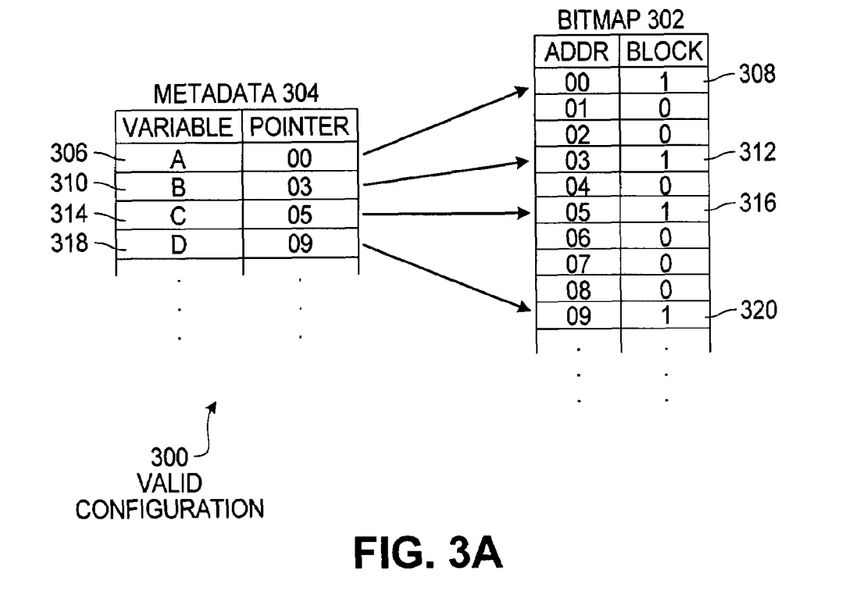
FIG. 3A is a diagram illustration of an embodiment showing a valid data structure.

FIG. 3A is a diagram illustration of an embodiment 300 showing a valid configuration of a datastore and bitmap. The bitmap 302 is illustrated after having been analyzed for the starting locations of each cell, as would be the case after completing the steps 206 and 208 of embodiment 200. In the bitmap 302, a '1' indicates that the block is the start of a cell and a '0' indicates that the block is not the start of a cell.

The metadata 304 illustrates four variables with pointers. Variable A in row 306 has a pointer to address 00 in the bitmap 302, as illustrated in row 308. The illustrated state of the bitmap 302 is that when performing the step 218 of embodiment 200, where the pointer is verified to point to the starting block as indicated by a flipped bit. If the row 308 were to have a '0' in the bitmap, the test of block 218 would fail and the data structure would be invalid. In this case, the row 308 indicates a '1' and the row is considered valid.

Similarly, variable B in row 310 points to row 312 of the bitmap 302, which is '1' and thus valid, as well as variable C in row 314 points to a valid row 316 and variable D in row 318 points to a valid row 320.

As each pointer is evaluated in the embodiment 200, the value of the bitmap for the address is checked to be '1' and then flipped to '0'. After processing the bitmap 302 using the metadata 304, the resultant bitmap would have all '0' values.

In some embodiments, a bitmap may start with a '1' value. In the present embodiment, the bitmap is assumed to have an initial value of '0' and a flipped value of '1'.

Figure 3B:
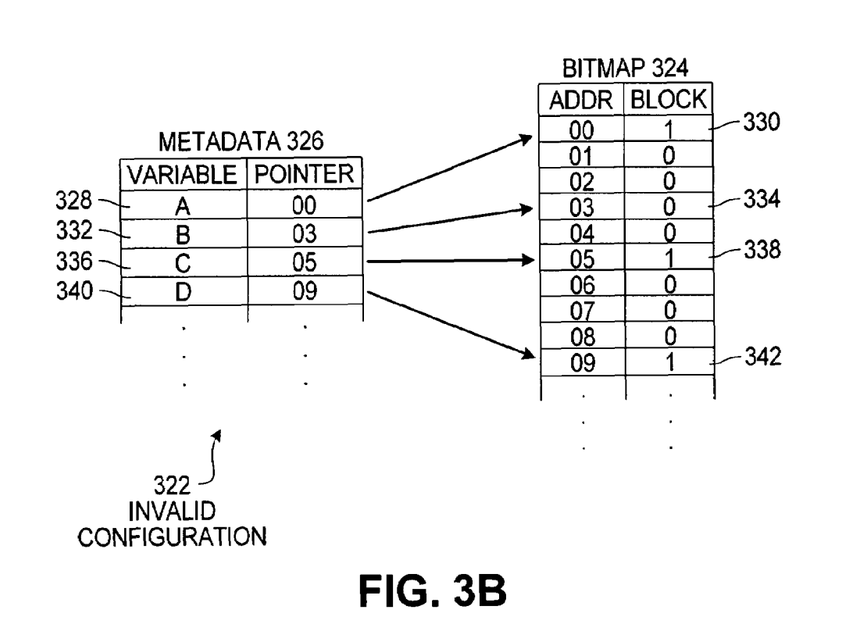
FIG. 3B is a diagram illustration of an embodiment showing a first invalid data structure.

FIG. 3B is a diagram illustration of an embodiment 322 showing a first invalid configuration of a datastore and bitmap. As above, the bitmap 324 is illustrated as if steps 206 and 208 of embodiment 200 have been completed. The bitmap 324 contains three flipped bits, as shown in rows 330, 338, and 342.

Row 328 of the metadata 326 shows variable A pointing to row 330 of bitmap 324. Row 332 of the metadata 326 shows variable B pointing to row 334 for which the bit is not flipped. In such a case, variable B may return corrupt data as it points to a block in the middle of a cell. The embodiment 322 is invalid because of variable B in row 332.

Variable C in row 336 points to a valid row 338 as does variable D in row 340 point to a valid row 342.

Embodiment 322 illustrates one corruption or inconsistency that may be detected by the method of embodiment 200.

Figure 3C:
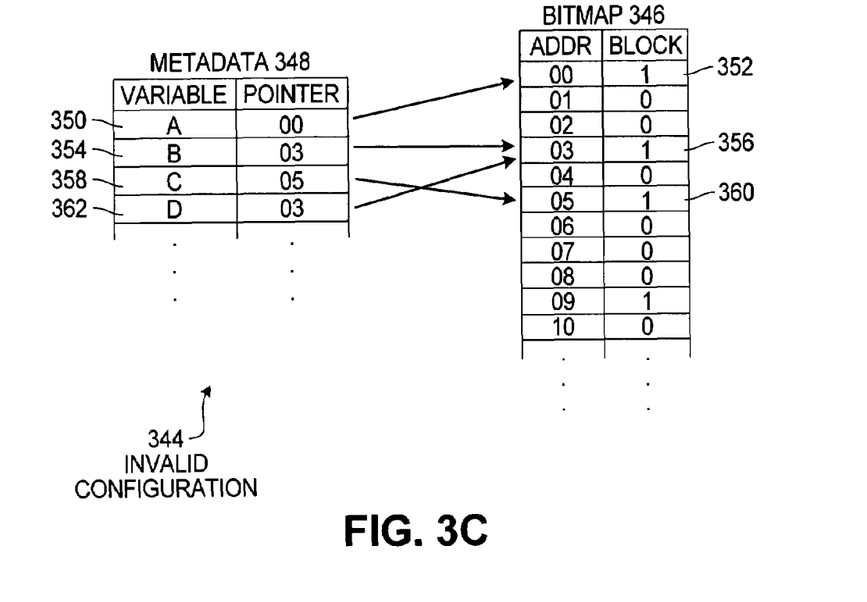
FIG. 3C is a diagram illustration of an embodiment showing a second invalid data structure.

FIG. 3C is a diagram illustration of an embodiment 344 showing a second invalid configuration of a datastore and bitmap. As with embodiments 300 and 322, embodiment 344 is illustrated as if steps 206 and 208 have been completed. The metadata illustrates two pointers, in rows 354 and 362 as pointing to the same row 356 in the bitmap 346.

Variable A in row 350 points to a valid row 352 of bitmap 346. Similarly, variable C in row 358 points to a valid row 360 of bitmap 346.

Variables B in row 354 and D in row 362 both point to row 356. For the first pass of steps 218 and 224 of embodiment 200, the variable B of row 354 may be determined valid. However, after the first pass, the bit in row 356 would be flipped to indicate '0' and the step 218 would fail in a second pass.

In some embodiments, the check of step 218 may not be present. In such an embodiment, the step 224 may merely toggle the bit to the opposite state. In such an embodiment with the situation of embodiment 344 where two pointers point to the same block, the first pass would change the bit to '0' and the second pass would change the bit back to '1'. A failure would then occur at block 226, as the bit would not be '0' after all the pointers were processed.

Figure 3D:
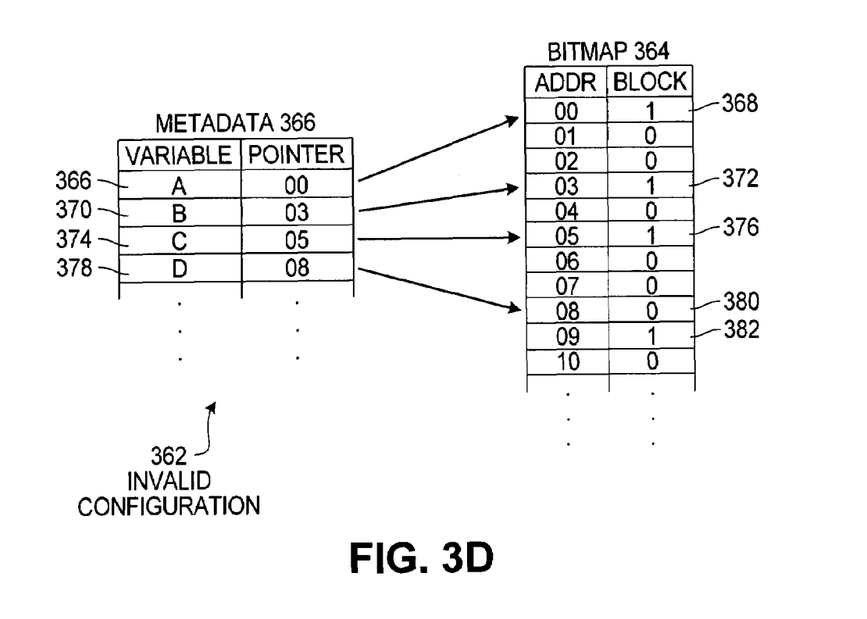
FIG. 3D is a diagram illustration of an embodiment showing a third invalid data structure.

FIG. 3D is a diagram illustration of an embodiment 362 showing a third invalid configuration of a bitmap 364 and metadata 366. As with embodiments 300, 322, and 344, embodiment 362 is illustrated as if steps 206 and 208 have been completed. The metadata contains row 378 that has a pointer to row 380, which does not correspond with the starting block of a cell, rather than block 382 which is a starting block for a cell.

Variable A in row 366 points to a valid row 368 of bitmap 364. Similarly, variable B in row 370 and variable C in row 374 point to rows 372 and 376, respectively.

Variable D in row 378 points to row 380 rather than row 382 of bitmap 364. This is an example of an incorrect pointer that would be detected in blocks 218 or 226 of embodiment 200.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:

reading a datastore having cells of data, each cell comprising at least one block of data, said datastore having metadata comprising pointers into said datastore, said pointers comprising a reference to one beginning block;

using a bitmap having a bit corresponding to each of said blocks of data, said bitmap having each bit set to an initial value;

for each cell, changing a bit in said bitmap corresponding to a first block for said cell to a second condition;

validating said datastore when the number of said bits in a second condition is equal to the number of said cells of data;

for each of said pointers, flipping a bit corresponding to said one beginning block; and validating said datastore when the number of said bits in said second condition is zero.

2. The method of claim 1 further comprising:

detecting that said datastore is invalid when said flipping comprises changing said bit from said initial value to said second condition.

3. The method of claim 1, said datastore being at least a portion of a registry store for an operating system.

4. The method of claim 1, each of said blocks of data being equal in size.

5. A computer readable medium comprising computer executable instructions adapted to perform the method of claim 1.

6. A method comprising:

storing data in a datastore, said datastore comprising a plurality of blocks of data, said data being stored in a cell comprising at least one of said plurality of blocks of data;

defining metadata comprising pointers to said data in said datastore, said pointers comprising a starting block for one of said cells;

defining a bitmap having a bit for every one of said plurality of blocks of data, each of said bits in said bitmap being set to an initial value;

validating said datastore by a method comprising:

for each cell, changing a bit in said bitmap corresponding to said first block in said cell, said changing comprising setting said bit to a second value;

determining a first validity for said datastore using said bitmap by comparing the number of cells to the number of bits in said bitmap set to said second value;

for each of said pointers, flipping a bit corresponding to said first block said defined in said metadata; and determining a second validity for said datastore when the number of said bits in said second condition is zero.

7. The method of claim 6, said determining all said first validity for said datastore comprising determining said datastore is valid when the number of said bits having said second value is equal to the number of said cells.

8. The method of claim 6, said datastore being at least a portion of a registry for an operating system.

9. A computer readable storage medium comprising computer executable instructions adapted to perform the method of claim 6.

10. A system comprising:

a datastore comprising a plurality of blocks and adapted to store data, said data being stored in a cell comprising at least one block of data;

a metadata store defining a data structure and comprising pointers to a first block of data in said cell;

a bitmap having at least one bit allocated for each of said blocks of data;

a verification engine adapted to:

for each cell, change a bit in said bitmap, said changing comprising setting said bit to a second value from an initial value;

determine a first validity for said datastore using said bitmap;

for each of said pointers in said metadata store, flipping a bit corresponding to said one beginning block; and determining a second validity for said datastore when the number of said bits in said second condition is zero.

11. The system of claim 10, said determine said first validity for said datastore comprising determine said datastore is valid when the number of said bits having said second value is equal to the number of said cells.

12. The system of claim 10, said datastore being at least a portion of a registry for an operating system.

13. The system of claim 10, each of said blocks of data being equal in size.

14. The system of claim 10, said data structure being a hierarchical data structure.

15. The system of claim 10, said data structure having a one to one relationship between said data and said cells.

\* \* \* \* \*

UNITED STATES PATENT AND TRADEMARK OFFICE
CERTIFICATE OF CORRECTION

PATENT NO. : 7,689,604 B2  
APPLICATION NO. : 11/800701  
DATED : March 30, 2010  
INVENTOR(S) : Dragos C. Sambotin Page 1 of 1

It is certified that error appears in the above-identified patent and that said Letters Patent is hereby corrected as shown below:

In column 8, line 1, in Claim 7, after "determining" delete "all".

Signed and Sealed this  
Eighth Day of February, 2011

David J. Kappos  
*Director of the United States Patent and Trademark Office*